US010623843B1

(12) United States Patent
Jorgovanovic et al.

(10) Patent No.: US 10,623,843 B1
(45) Date of Patent: Apr. 14, 2020

(54) USING BANDWIDTH-LIMITED AUDIO DEVICES

(71) Applicant: Amazon Technologies, Inc., Seattle, WA (US)

(72) Inventors: Milos Jorgovanovic, Mountain View, CA (US); Hans Edward Birch-Jensen, San Jose, CA (US); Ganesha Batta, Cupertino, CA (US); Muhaiyadeen Ansarullah Habibullah, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/883,872

(22) Filed: Jan. 30, 2018

(51) Int. Cl.
H04R 1/10 (2006.01)
G06F 3/16 (2006.01)
G10L 15/08 (2006.01)

(52) U.S. Cl.
CPC .......... H04R 1/1041 (2013.01); G06F 3/167 (2013.01); G10L 15/08 (2013.01); H04R 1/1016 (2013.01); G10L 2015/088 (2013.01); H04R 2420/07 (2013.01)

(58) Field of Classification Search
CPC .......... H04R 1/1016; H04R 1/1041; H04R 2420/07; G06F 3/167; G10L 15/08; G10L 2015/088
See application file for complete search history.

(56) References Cited

U.S. PATENT DOCUMENTS

2018/0088902 A1* 3/2018 Mese ............... G09G 5/006
2018/0158468 A1* 6/2018 Tu ................... G10L 21/043

* cited by examiner

Primary Examiner — Mark Fischer
(74) Attorney, Agent, or Firm — Pierce Atwood LLP

(57) ABSTRACT

A system and method includes a first device (e.g., a primary wireless earbud) and a second device (e.g., a secondary wireless earbud). The first device receives audio data from a third device (e.g., a mobile device) and sends the audio data to the second device; the first and second devices output the audio. When the first device detects a wakeword, to reduce use of wireless bandwidth, the first device sends only an indication of duration of playback of the audio data to the second device instead of the audio data. The second device outputs blank audio having a duration corresponding to the received location to stay in sync with the first device. The first device transmits audio data corresponding to the wakeword to the third device.

20 Claims, 15 Drawing Sheets

USING BANDWIDTH-LIMITED AUDIO DEVICES

BACKGROUND

Speech-recognition systems have progressed to the point at which humans are able to interact with computing devices using their voices. Such systems employ techniques to detect when speech is occurring and to identify the words spoken by a human user based on the received audio input. Voice-activity detection, speech recognition, and natural-language understanding processing techniques enable speech-based user control of a computing device to perform tasks based on the user's spoken commands. The combination of voice-activity detection, speech recognition, and/or natural-language understanding processing techniques is referred to herein as speech processing. Speech processing may also involve converting a user's speech into text data, which may then be provided to various text-based software applications. Speech processing may be used by wired or wireless headphones, computers, hand-held devices, telephone computer systems, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
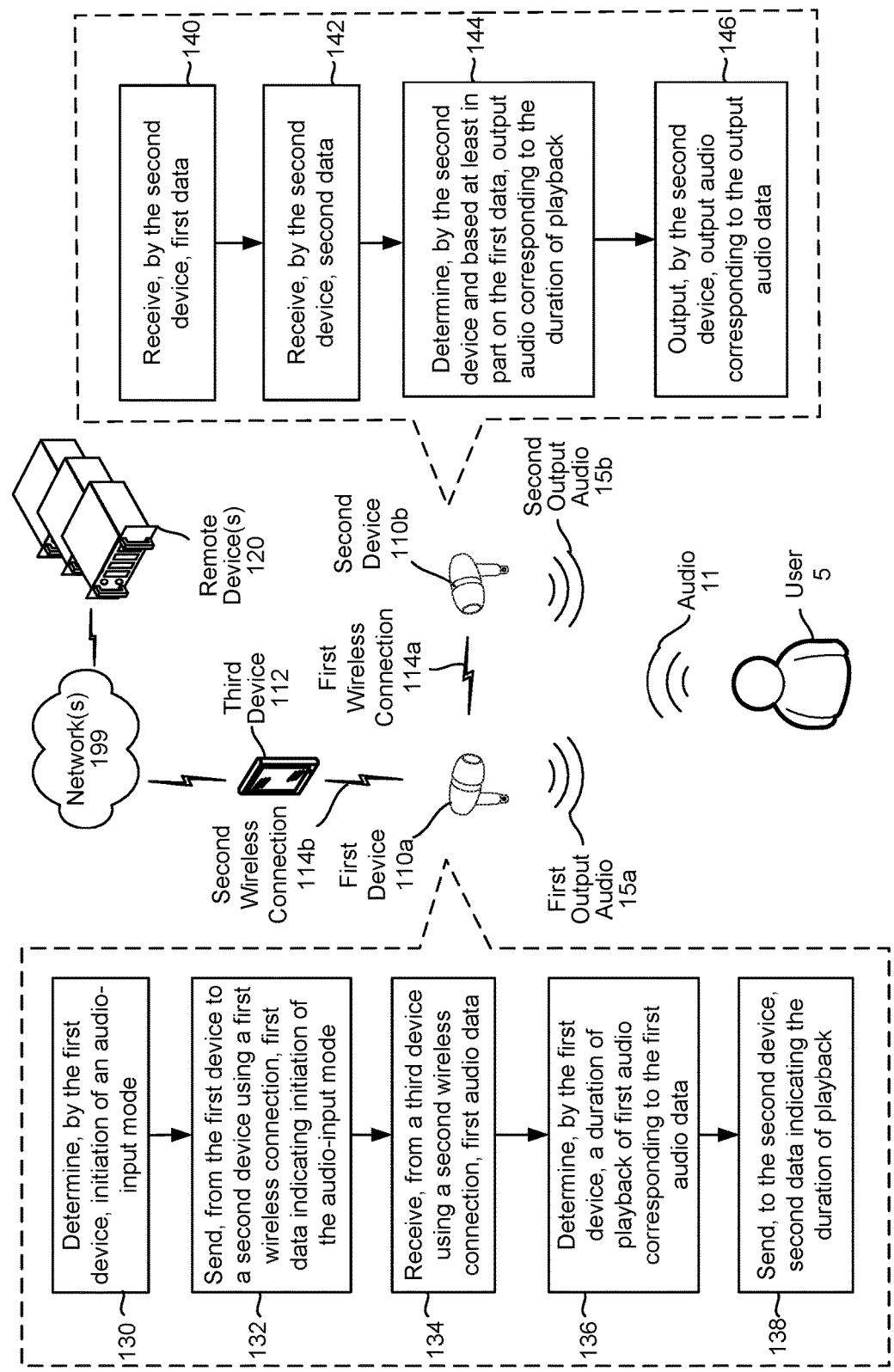
FIG. 1 illustrates a system configured to output, capture, and send audio using a pair of connected devices according to embodiments of the present disclosure.

Some electronic devices may operate using a voice-based user interface. That is, certain electronic devices may include an audio-based input/output interface. A user may interact with such a device—which may be, for example, a smartphone, tablet, computer, or other speech-controlled device—partially or exclusively using his or her voice and ears. Examples of voice-based interactions may include telephone calls, audio messaging, video messaging, search queries, weather forecast requests, navigation requests, or other such interactions. The device may include one or more microphones for capturing voice input and hardware and/or software for converting the voice input into audio data. As explained in greater detail below, the device may further include hardware and/or software for analyzing the audio data and determining commands and requests therein and/or may send the audio data to a remote device for such analysis. The device may include an audio output device, such as one or more speakers, for outputting audio that responds to and/or prompts for the voice input.

The device may monitor ambient audio to determine whether speech is present in the audio using, for example, voice-activity detection (VAD). Once the device detects speech in the audio, it may detect if a wakeword is represented in the audio. This wakeword-detection process may also be referred to as keyword detection, with the wakeword being a specific example of a keyword. To determine whether a wakeword is spoken, the device may compare captured audio data to a stored wakeword signature. The wakeword signature may correspond to a built-in word or phrase, such as "Alexa" or "computer," or may be programmed by the user. When the device detects a wakeword, the device may "wake" and send captured audio data to a remote system for speech processing and to determine output content responsive to the received audio.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Thus, a spoken-language processing system may include an ASR component that receives audio input of a user utterance and generates one or more likely transcriptions of the utterance and may also include a NLU component that receives textual input, such as a transcription of a user utterance, and determines the meaning of the text in a way that can be acted upon, such as by a computer application.

A speech-processing system may be configured as a relatively self-contained system in which a single device captures audio, performs speech processing, and executes a command corresponding to the input speech. Alternatively, a speech processing system may be configured as a distributed system in which a number of different devices combine to capture audio of a spoken utterance, perform speech processing, and execute a command corresponding to the utterance. Although the present application describes a distributed system, the teachings of the present application may apply to any system configuration.

ASR and NLU can be computationally expensive; significant computing resources may be needed to perform ASR and NLU processing within a reasonable time frame. Because of this expense, a distributed computing environment may be used when performing speech processing. A typical such distributed environment may involve one or more local devices having one or more microphones being configured to capture sounds from a user speaking and convert those sounds into an audio signal or other types of data. The audio signal/data may then be sent to one or more downstream remote devices for further processing, such as converting the audio signal into an ultimate command. For example, one or more servers may combine to perform ASR, one or more servers may combine to perform NLU, and so on. The command may then be executed by one or a combination of remote and local devices depending on the command itself.

Use of the above-described speech-controlled device may, at times, be difficult or impossible. Sometimes, such as while exercising, working, or driving, the user's hands may be occupied, and the user may not be able to hold the device in such a fashion as to effectively interact with the device's audio interface. Other times, the level of ambient noise may be too high for the device to accurately detect speech from the user or too high for the user to understand audio output from the device. In these situations, the user may prefer to connect headphones to the device. As the term is used herein, "headphones" may refer to any hands-free, wearable audio input/output device and includes headsets, earphones, earbuds, or any similar device. For added convenience, the user may choose to use wireless headphones, which communicate with the device—and optionally each other—via a wireless connection, such as Bluetooth, or any other type of wireless connection.

In the present disclosure, for clarity, headphone components that communicate wirelessly with both a device and each other are referred to as "earbuds," but the term "earbud" does not limit the present disclosure to any particular type of wired or wireless headphones. The present disclosure may further differentiate between a "right earbud," meaning a headphone component disposed near a right ear of a user, and a "left earbud," meaning a headphone component disposed near a left ear of a user. A "primary" earbud communicates with both a "secondary" earbud, using a first wireless connection (such as a Bluetooth connection); the primary earbud further communicates with a device (such as a smartphone) using a second connection (such as a second Bluetooth connection). The secondary earbud communicates only with the primary earbud using the first connection.

The primary and secondary earbuds may include similar hardware and software and simply be configured as a primary/secondary pair; in other instances, the secondary earbud contains only a subset of the hardware/software included in the primary earbud and lacks, for example, circuitry to communicate over the second wireless connection. If the primary and secondary earbuds include similar hardware and software, they may trade the roles of primary and secondary prior to or during operation. In the present disclosure, the primary earbud may be referred to as the "first device," the secondary earbud may be referred to as the "second device," and the smartphone or other device may be referred to as the "third device." The first, second, and/or third devices may communicate over a network with one or more server devices, which may be referred to as "remote device(s)."

Fully wireless earbuds use wireless network connections for both the first connection (i.e., between the earbuds) and the second connection (i.e., between the primary earbud and the smartphone). Users may choose to use such earbuds for their convenience, for comfort, or for any other reason. Fully wireless earbuds may, however, present design and usage challenges not encountered by other types of earbuds. For example, sending data (such as audio data, communication data, sensor data, control data, firmware data, or any other such data) from the third device (e.g., smartphone) to the first (primary earbud) device and then from the first device to the second (secondary earbud) device may consume some or all of available wireless network bandwidth. Additional wireless network bandwidth may thus not be available for sending additional data, such as audio data captured by the first device and sent to the third device. For example, the user may be listening to music or be participating in a phone call through the headphones and utter a wakeword and command; because all or most of the wireless network bandwidth may be consumed by sending the music to and between the earbuds, the wakeword and command may not be sent to the third device or may be sent with degraded quality. The playback of the music may similarly be degraded.

The present disclosure offers a system and method for improved outputting of audio and sending of audio corresponding to an utterance of the user. The primary earbud determines that an audio-input mode has been initiated by, for example, monitoring ambient audio for an utterance using, for example, VAD. The primary earbud may receive data indicating initiation of the audio-input mode from the third device and may send this data to the secondary earbud; the secondary earbud, in response, enters a "mute" mode, during which it may finish outputting any audio already transmitted to it by the primary earbud but then ceases outputting transmitted audio, as explained in greater detail below. The primary and/or secondary earbud may lower their output volumes. During the audio-input mode, when the primary earbud receives an audio packet from the third device, it does not forward the audio packet to the secondary earbud, as it would during normal operation. Instead, the primary earbud determines the duration of playback of audio corresponding to the audio packet; the duration of playback may correspond to the number of audio samples in the audio packet, a size of the audio packet, a time indication corresponding to the audio packet, or any other such indication of duration. The primary earbud sends the duration to the secondary device. The secondary device, because it is in mute mode, generates and outputs audio based on the received duration by, for example, injecting a number of zeros corresponding to the number of samples in its audio playback buffer. A typical audio packet may take 2.5 milliseconds to send; sending only the duration of the audio packet may take only about 100 microseconds, thereby reducing the bandwidth used for the primary-secondary connection by a factor of about 25. Once the user has finished speaking (and, in some embodiments, once audio playback replying to the user has finished outputting), the primary earbud sends a command to the secondary earbud to exit its mute mode and resume outputting normal audio packets sent from the primary.

One or more microphones may be disposed on the primary earbud. The first device, i.e., the primary earbud, monitors ambient audio for an utterance using, for example, VAD. As explained further below, the primary earbud may perform a varying degree of processing of the audio; it may, for example, convert the audio into audio data via audio processing, monitor the audio data for a wakeword, and/or other such processing.

FIG. 1 illustrates a system for outputting and detecting audio 11 using a first device 110a (i.e., a primary earbud) and a second device 110b (i.e., a secondary earbud). The first device 110a and the second device 110b communicate using a first connection 114a, which may be a Bluetooth connection. The first device 110a communicates with a third device 112, such as a smartphone, using a second connection 114b, which may also be a Bluetooth connection. The third device 112 communicates with one or more remote device(s) 120, which may be server devices, via a network 199, which may be the Internet, a wide- or local-area network, or any other network. The first device 110a may output first output audio 15a, and the second device 110b may output second output audio 15b.

In various embodiments, and as explained in greater detail below, the first device 110a determines (130) initiation of an audio-input mode. The first device 110a sends (132) first data indicating initiation of the audio-input mode to the second device 110b using a first wireless connection 114a. The first device receives (134) first audio data from the third device 112 using a second wireless connection 114b and outputs corresponding first output audio 15a. The first device 110a determines (136) a duration of playback of first audio corresponding to the first audio data and sends (138) second data indicating the duration of playback to the second device. The second device 110b receives (140) the first data, receives (142) the second data, and determines (144) output audio corresponding to the duration of playback. The second device outputs (146) second output audio 15b corresponding to the audio output data.

Figure 2:
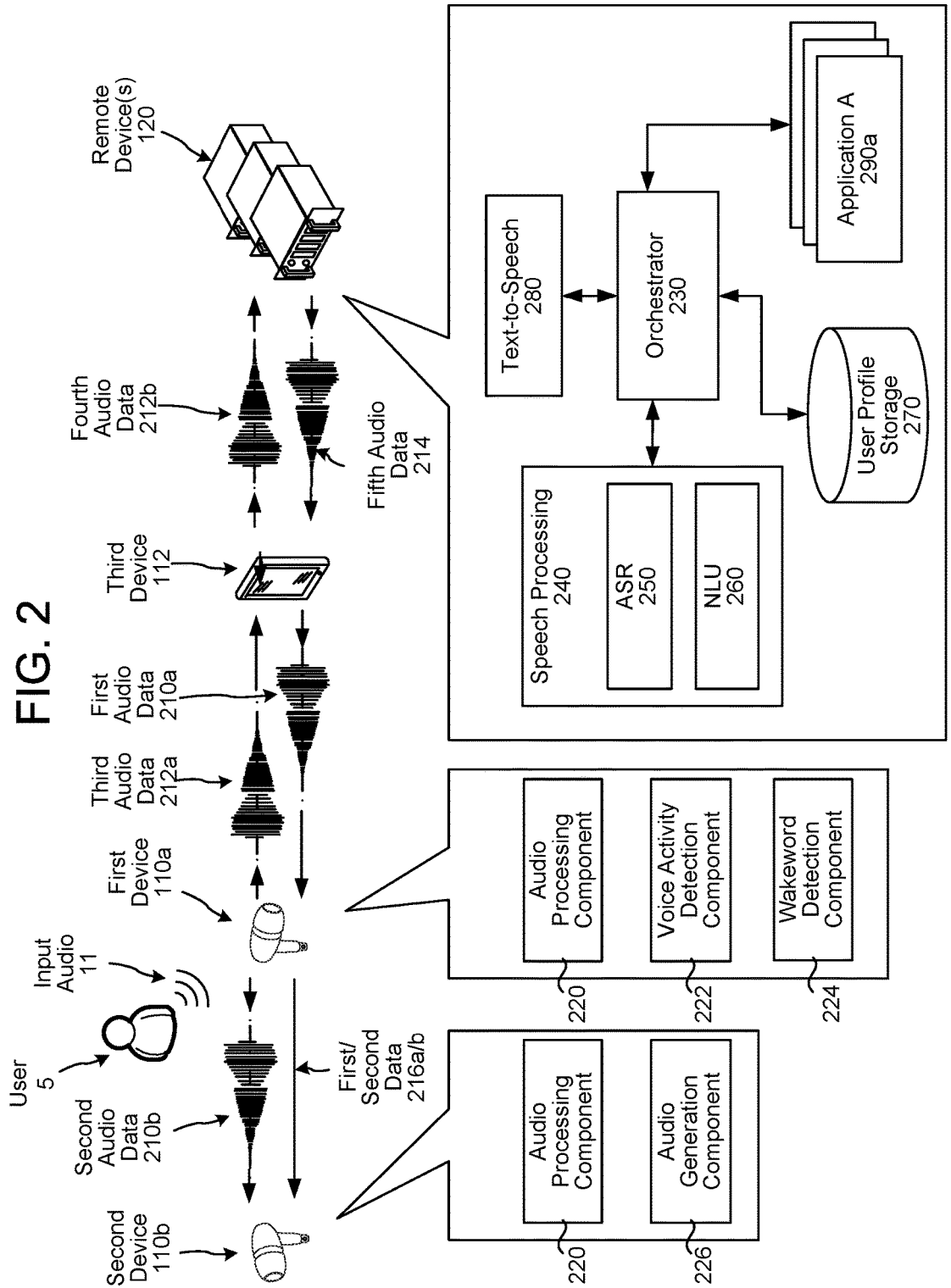
FIG. 2 illustrates a system configured to use a voice interface according to embodiments of the present disclosure.

As indicated above, the system of FIG. 1 may operate using various speech processing and other components as described in FIG. 2. The various components may be located on the same or on different physical devices. Communication between various components may occur directly or across a network(s) 199. Below is a discussion of those components, followed by a further discussion of outputting and capturing audio.

The third device 112 may send first audio data 210a to the first device 110a; this first audio data 210a may correspond to music, communication, voice, or any other such audio. The first device 110a may output audio corresponding to the first audio data 110a and may send some or all of the first audio data 210a to the second device as second audio data 210b. For example, the first audio data 210a may include left and right stereo channels, and the second audio data 210b may include only one of the left and right stereo channels. The first device 110a may further receive input audio 11, such as voice data, from a user 5 and determine third audio data 212a, which it may send to the third device 112. The third device 112 may send some or all of the third audio data 212a to the remote device(s) 120 as fourth audio data 212b and may receive a response in fifth audio data 214 therefrom. As explained herein, during an audio-input mode, instead of sending the second audio data 210b to the second device 110b, the first device 110a may instead send data 216a/b, which may include first data indicating initiation of the audio-input mode and second data indicating duration of playback of the first audio data 210a.

The first device 110a may include an audio-processing component 220, a voice-activity detection component 222, a wakeword detection component 224, and/or other components. The device 110a may receive input audio 11 from a user 5 using an audio capture component, such as a microphone or microphone array, as explained in more detail with reference to FIGS. 3A and 3B. The audio-processing component 220 may receive the captured audio and determine third audio data 212a based thereon. In some embodiments, the audio-processing component 220 includes a hardware and/or software analog-to-digital converter that converts the analog input audio, as captured by the microphone, into a digital audio signal for inclusion in the third audio data 212a. The analog-to-digital converter may sample the input audio 11 at any of a variety of different sample rates and amplifications. The audio-processing component 220 may further include noise reduction, automatic gain control, or any other such audio processing hardware or software. The audio-processing component 220 may include an encryption and/or compression component to encrypt and/or compress the audio data; the encryption and/or compression may conform to an industry standard, such as Bluetooth.

The voice-activity detection component 222 may monitor the input audio 11 to determine whether speech is present. For example, the voice-activity detection component 222 may analyze various quantitative aspects of the audio data, such as, for example, the spectral slope between one or more frames of the audio, the energy levels of the audio in one or more spectral bands, the signal-to-noise ratios of the audio in one or more spectral bands, and/or other quantitative aspects. In some instances, the voice-activity detection component 222 may use a trained classifier configured to distinguish speech from background noise. The classifier may be implemented using linear classifiers, support vector machines, and/or decision trees. The voice-activity detection component 222 may apply techniques using, for example, a Hidden Markov Model (HMM) or a Gaussian Mixture Model (GMM) to compare the audio data to one or more acoustic models in speech storage; the acoustic models may include models corresponding to speech, noise (e.g., environmental noise or background noise), and/or silence. The voice-activity detection component 222 may "trigger" when it determines that speech is present in the audio and may transmit notification of the trigger to, for example, the audio-processing component 220, the wakeword detection component 224, another device 110a/110b, and/or the third device 112.

The wakeword detection component 224 may process input the audio data—continuously, at intervals, and/or in response to a notification of the triggering of the VAD component—to determine if a keyword (e.g., a wakeword) is present in the audio data. Following detection of a wakeword, the first device 110a may output third audio data 212a, which may include at least a portion of the audio data, to the third device 112, which may in turn send corresponding fourth audio data 212b to the remote device(s) 120. The fourth audio data 212b may at least partially correspond to input audio 11 captured subsequent to input audio corresponding to the wakeword. That is, the fourth audio data 212b may correspond to a spoken command that follows a spoken wakeword and optionally includes the spoken wakeword.

The wakeword detection component 224 may compare audio data to stored models or data to detect a wakeword. One approach for wakeword detection applies general large-vocabulary continuous speech-recognition (LVCSR) systems to decode the audio signals, with wakeword searching conducted in the resulting lattices or confusion networks. LVCSR decoding may, however, require relatively high computational resources. Another approach for wakeword detection builds HMMs for each wakeword and non-wakeword speech signals respectively. The non-wakeword speech includes other spoken words, background noise, etc. There may be one or more HMMs built to model the non-wakeword speech characteristics, which are named filler models. Viterbi decoding may be used to search the best path in the decoding graph, and the decoding output may be further processed to make the decision on keyword presence. This approach may be extended to include discriminative information by incorporating a hybrid DNN-HMM decoding framework. In another example, the wakeword detection component 224 may be built on deep neural network (DNN) and/or recursive neural network (RNN) structures without using a HMM. Such a wakeword detection component 224 may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

The second device 110b may include an audio processing component 220, which may include some or all of the features described above. The second device 110b may further include an audio generation component 226. When the first audio device 110a determines the initiation of the audio-capture mode and sends the first data to the second device 110b, the audio generation component 226 may generate audio in accordance with the received duration of playback. In some embodiments, when the first device 110a receives an audio packet from the third device 112 that contains a certain number of samples, the first device 110a sends the number of samples (i.e., the duration of playback of audio corresponding to the received audio packet) to the second device 110b. The audio generation component 226 may then generate a number of samples of audio corresponding to the received number and thereafter cause the second device 110b to output the generated samples. For every sample of audio output by the first device 110a, the second device 110b outputs a generated sample of audio. The first device 110a and the second device 110b are thus in sync (i.e., outputting the same number of samples).

Upon receipt by the remote device(s) 120, the fourth audio data 212b or other data may be sent to an orchestrator component 230. The orchestrator component 230 may include memory and logic that enables it to transmit and receive various pieces and forms of data to various components of the system described herein.

The orchestrator component 230 may send the fourth audio data 212b to a speech-processing component 240. An ASR component 250 of the speech processing component 240 transcribes the output audio data 210b into text data representing one more hypotheses representing a spoken command represented in the fourth audio data 212b. The ASR component 250 may interpret the spoken command represented in the fourth audio data 212b based on a similarity between the spoken command and pre-established language models. For example, the ASR component 250 may compare the fourth audio data 212b with models for sounds (e.g., subword units, such as phonemes, senons, etc.) and sequences of sounds to identify words that match the sequence of sounds corresponding to the spoken command represented in the fourth audio data 212b. The ASR component 250 may send the text data generated thereby to an NLU component 260 of the speech processing component 240. The text data sent from the ASR component 250 to the NLU component 260 may include, for example, a top-scoring hypothesis or may include an N-best list including multiple hypotheses. The N-best list may additionally include a score associated with each hypothesis represented therein. Each score may indicate a confidence of ASR processing performed with respect to the hypothesis with which it is associated. While FIG. 2 illustrates components of the remote device(s) 120 communicating via the orchestrator component 230, one skilled in the art will appreciated that various components of the remote device(s) 120 may communication directly.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 may determine an intent of the command represented in the text data (e.g., an action that a user desires be performed) and/or pertinent pieces of information in the text data that allow a device (e.g., the devices 110a/110b, the remote device(s) 120, etc.) to execute the intent. For example, if the text data corresponds to "call mom," the NLU component 260 may determine that the user intended to activate a telephone application on his/her device and to initiate a call with a contact matching the entity "mom."

The remote device(s) 120 may also include or communicate with various applications 290. It should be appreciated that the remote device(s) 120 may additionally or alternatively communicate with one or more application servers executing third-party applications. The applications 290 may include, for example, shopping applications, mapping applications, weather applications, taxi or car-sharing applications, or the like. In some embodiments, the applications 290 include communications applications such as telephone applications, voice-over-IP applications, or similar applications; if these applications are used, the orchestrator component may send the fourth audio data 212b there and not to the speech-processing component 240.

An "application," as used herein, may be considered synonymous with a "skill." A skill may be software akin to an application. That is, a skill may enable the remote device(s) 120 and/or the application server(s) to execute specific functionality in order to provide output data to the user 5. The system may be configured with more than one skill. A skill may either be executed by the remote device(s) 120 or merely associated with the remote device(s) 120 (i.e., one executed by the application server(s)).

The remote device(s) 120 may include a text-to-speech (TTS) component 280 that generates fifth audio data 214 from text data using one or more different methods. In one method of synthesis called unit selection, the TTS component 280 matches text data against a database of recorded speech. The TTS component 280 may select matching units of recorded speech matching the text data and concatenates the units together to form the fifth audio data 214. In another method of synthesis, called parametric synthesis, the TTS component 280 varies parameters such as frequency, volume, and noise to create the fifth audio data 214 including an artificial speech waveform. Parametric synthesis may use a computerized voice generator, sometimes called a vocoder.

The remote device(s) 120 may also include or communicate with user profile storage 270 which may include information related to one or more user profiles corresponding to a user that communicates with the speech processing system. A user profile may include user specific data (such as preferences, etc.) that may be used to interpret and/or execute spoken commands. The user specific data may also be used to configure VAD/wakeword detection processing (such as that performed by the first device 110a) to be specific for a particular user.

Figure 3:
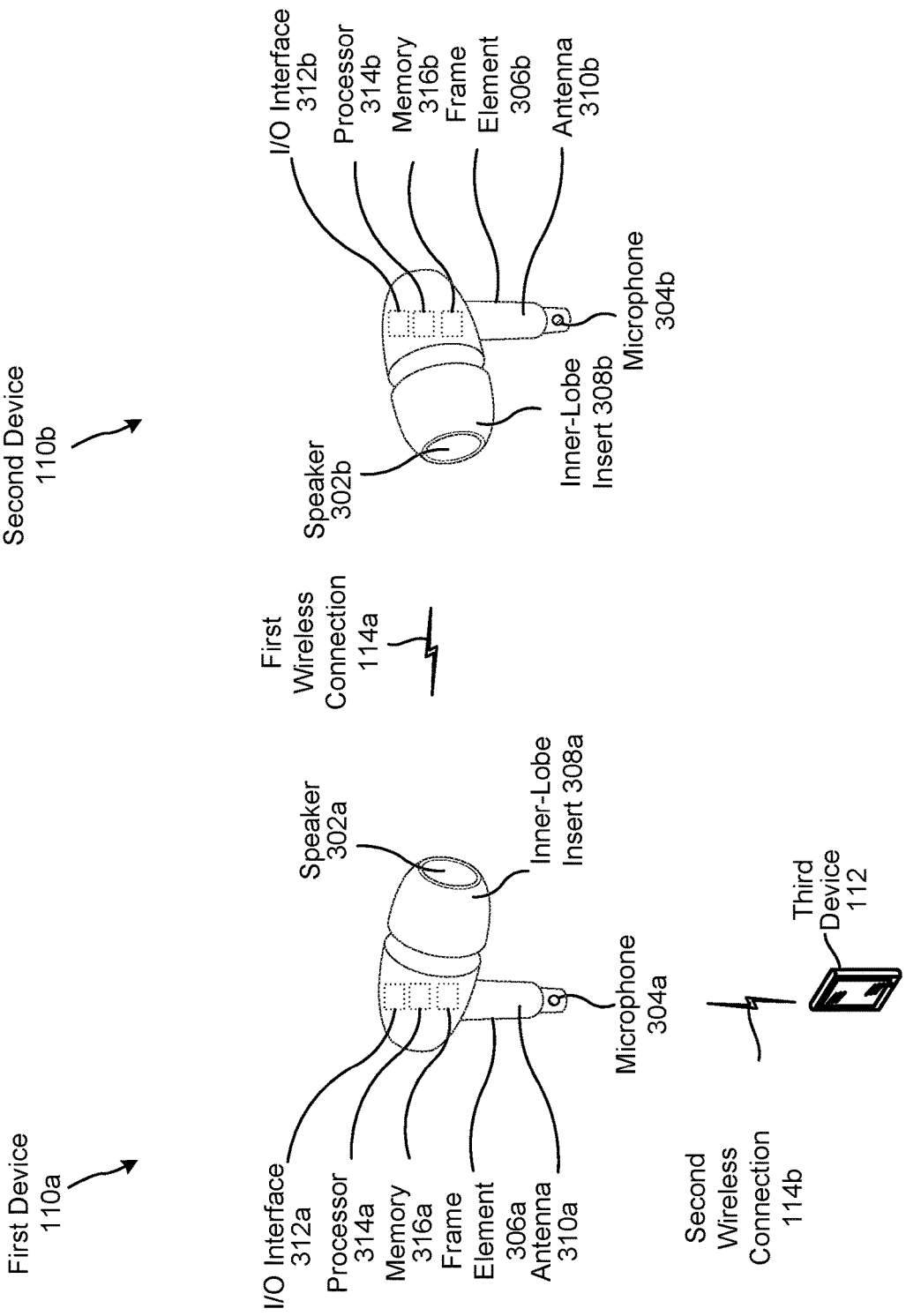
FIGS. 3A and 3B are conceptual diagrams of components of an audio output, capture, and sending system according to embodiments of the present disclosure.

FIGS. 3A and 3B illustrate additional features of an embodiment of the first device 110a and second device 110b, respectively. As shown, the first device 110a and second device 110b have similar features; in other embodiments, as noted above, the second device 110b (i.e., the secondary device) may have only a subset of the features of the first device 110a. For example, the second device 110b may not include a microphone or hardware and/or software for communicating over the second wireless connection 114b. As illustrated, the first device 110a and second device 110b are depicted as wireless earbuds having a frame element and an inner-lobe insert; as mentioned above, however, the present disclosure is not limited to only wireless earbuds, and any wearable audio input/output system, such as a headset, over-the-ear headphones, or other such systems, is within the scope of the present disclosure.

The devices 110a/110b include a speaker 302a/302b and a microphone 304a/304b. The speaker 302a/302b may be any type of speaker, such as an electrodynamic speaker, electrostatic speaker, diaphragm speaker, or piezoelectric speaker; the microphone 304a/304b may be any type of microphone, such as a piezoelectric or MEMS microphone. Each device 110a/110b may include one or more microphones 304a/304b.

The speaker 302a/302b and microphone 304a/304b may be mounted on, disposed on, or otherwise connected to a frame element 306a/306b. In some embodiments, the frame element 306a/306b is shaped to an over-the-ear shape such that the weight of the devices 110a/110b is borne by the user's ear. In other embodiments, the frame element 306a/306b is a housing for the speaker 302a/302b. The devices 110a/110b further include an inner-lobe insert 308a/308b that may bring the speaker 302a/302b closer to the eardrum of the user and/or block some ambient noise.

Figure 4:
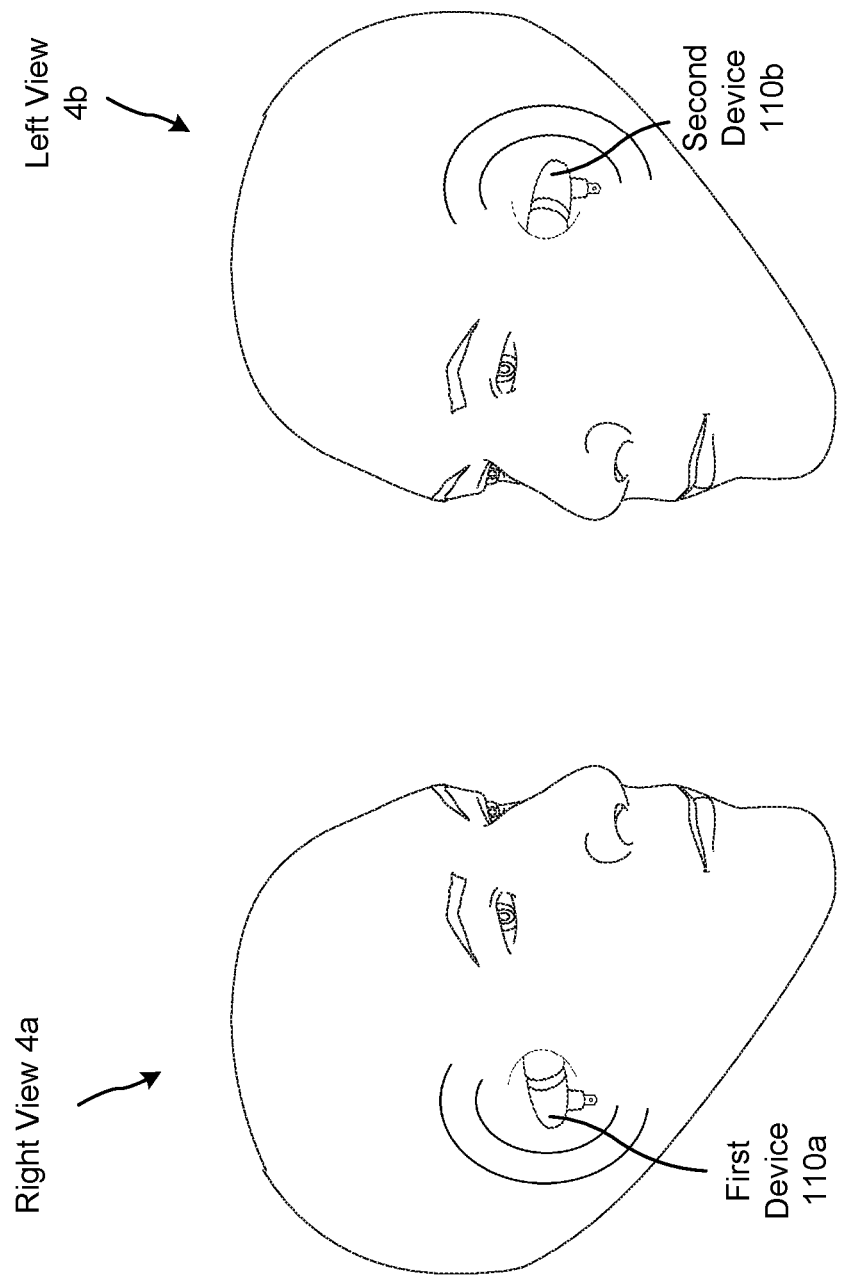
FIG. 4 is a conceptual diagram of components of an audio output, capture, and sending system according to embodiments of the present disclosure.

One or more additional components may be disposed in or on the frame element 306a/306b. One or more antennas 310a/310b may be used to transmit and/or receive wireless signals over the first connection 114a and/or second connection 114b; an I/O interface 312a/312b contains software and hardware to control the antennas 310a/310b and transmit signals to and from other components. A processor 314a/314b may be used to execute instructions in a memory 316a/316b; the memory 316a/316b may include volatile memory (e.g., random-access memory) and/or non-volatile memory or storage (e.g., flash memory). The instructions may correspond to the audio-processing component 220, voice-activity detection component 222, wakeword detection component 224, and/or other components discussed above. FIG. 4 illustrates a right view 4A and a left view 4B of a user of the first device 110a and the second device 110b.

Figure 5:
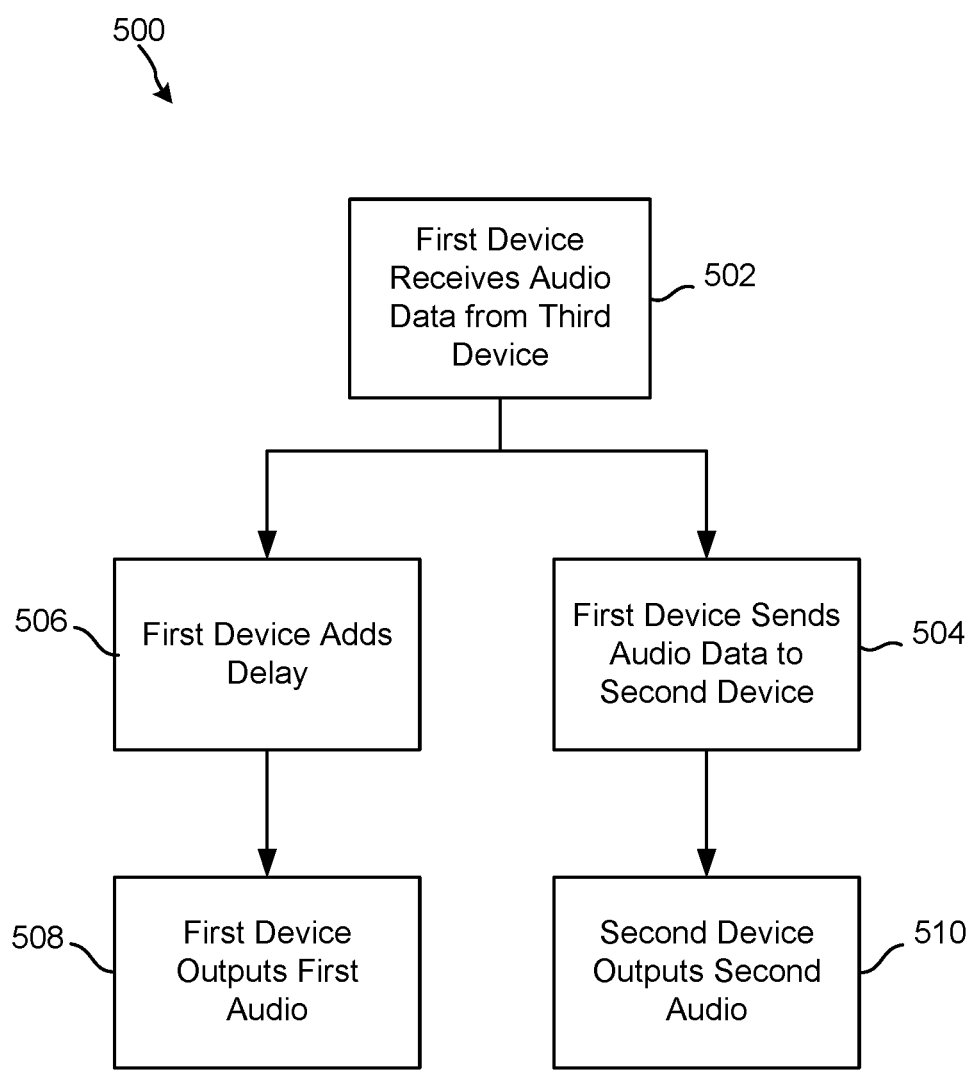
FIGS. 5-10 illustrate process flows for outputting, capturing, and sending audio according to embodiments of the present disclosure.
Figure 6:
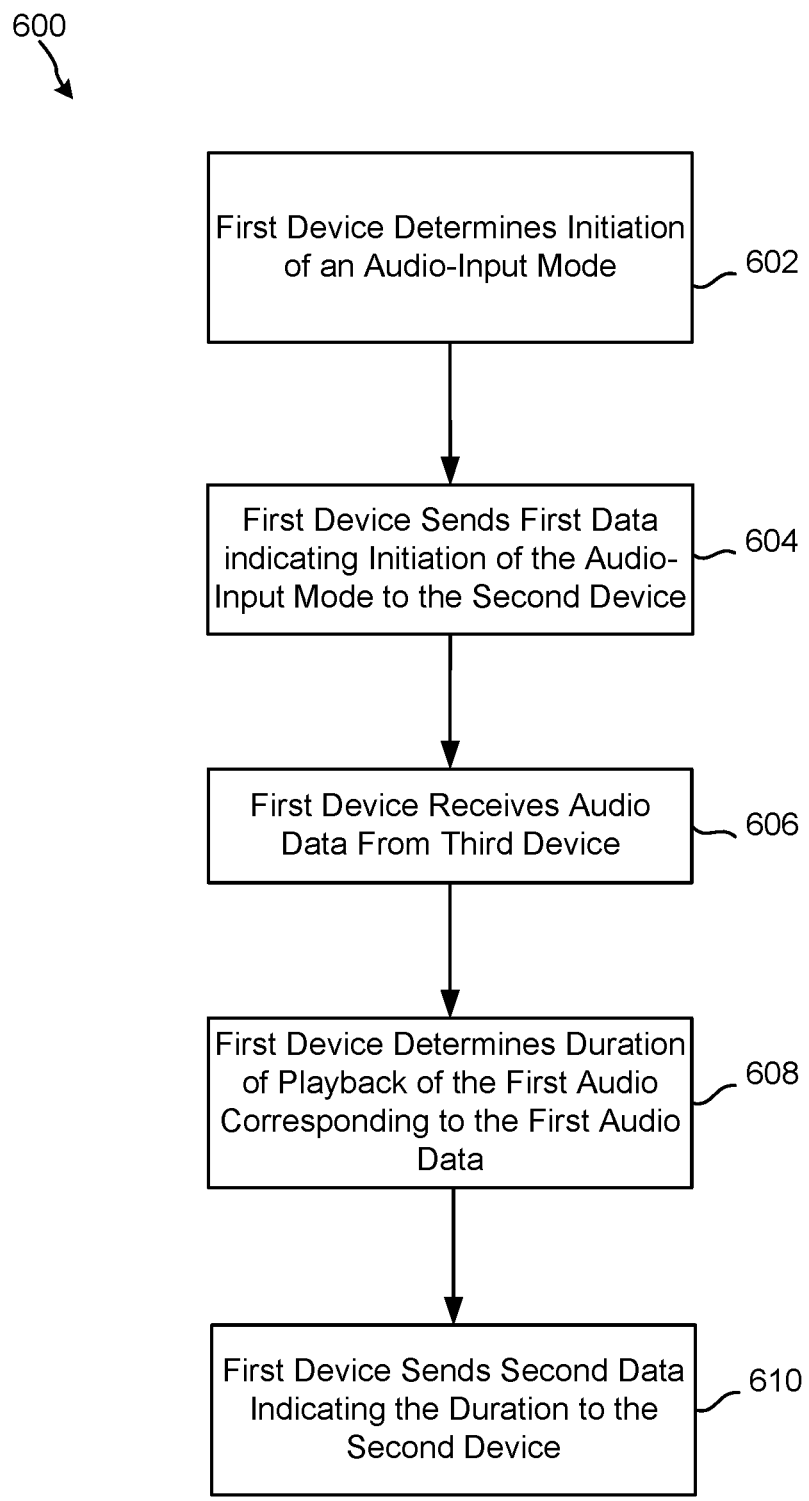
Figure 7:
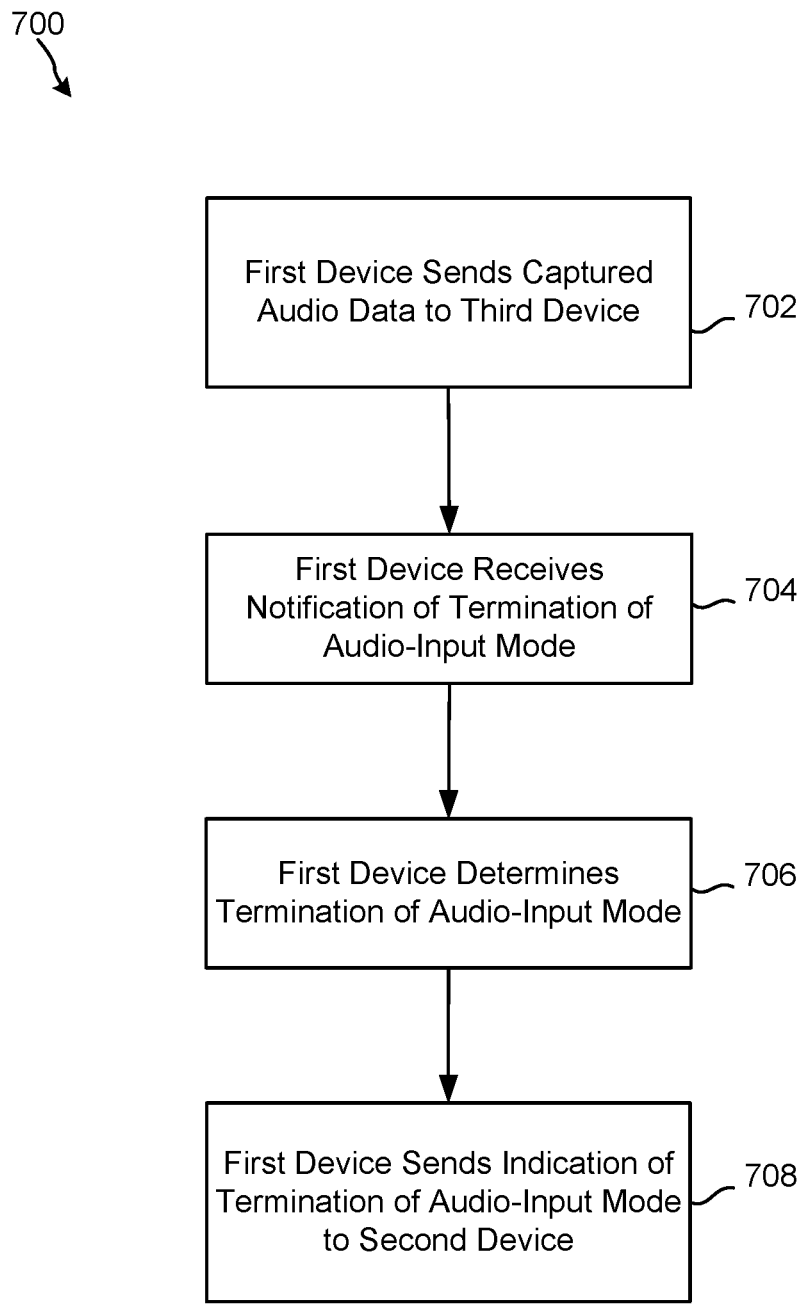
Figure 8:
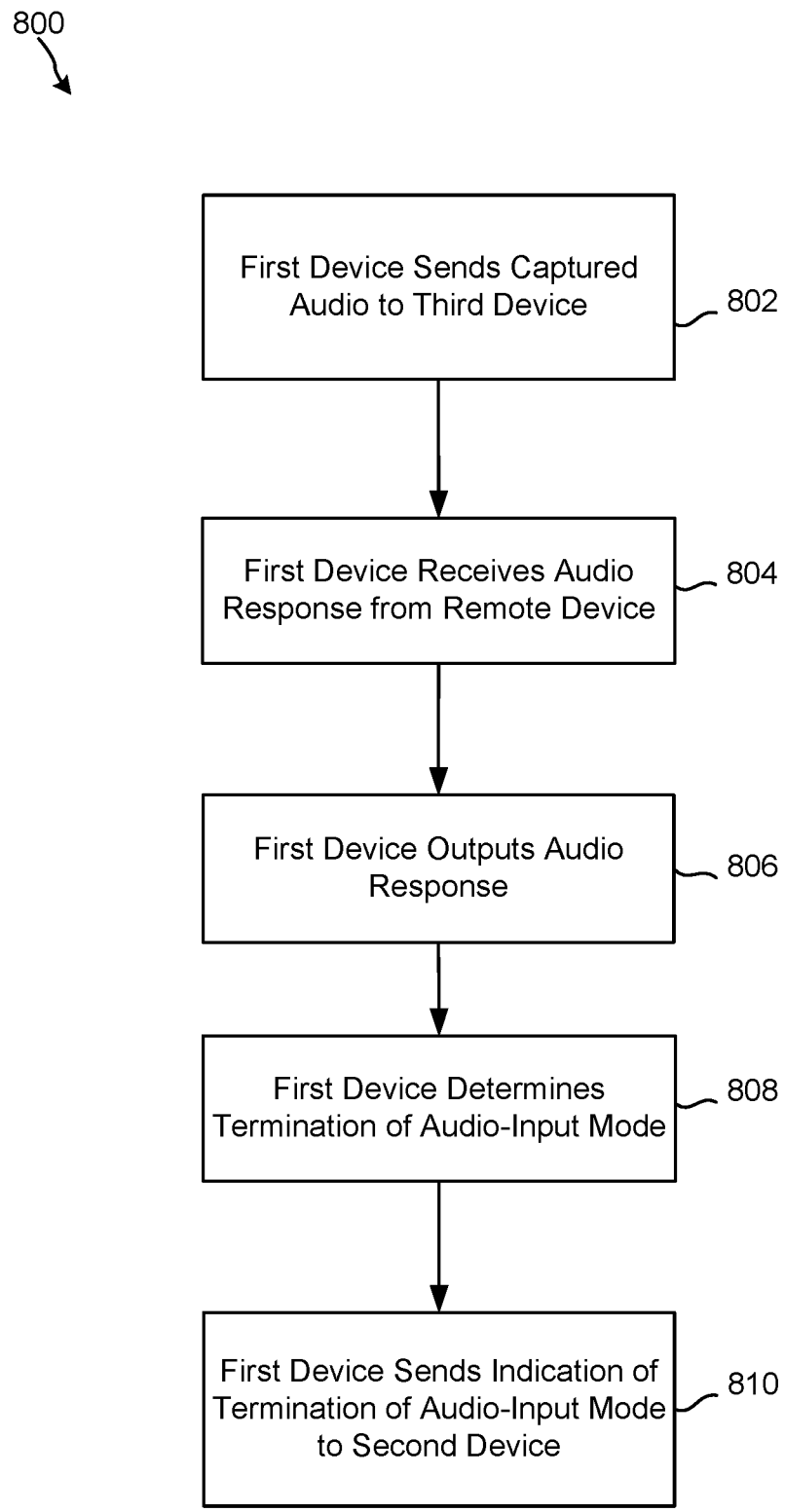

FIGS. 5-8 illustrate various process flows in accordance with the present disclosure. FIG. 5 is a process flow 500 corresponding to an embodiment in which the first device 110a receives audio from the third device and forwards it to the second device 110b; FIG. 6 is a process flow 600 corresponding to an embodiment in which the first device 110a determines initiation of an audio-input mode and sends only the duration of the audio to the second device 110b. FIGS. 7 and 8 are process flows 700 and 800 corresponding to embodiments in which the first device 110a determines termination of the audio-input mode. Each of these process flows is discussed below in greater detail.

Referring again to FIG. 5, the first device 110a receives (502) audio data from the third device 112. As explained herein, the audio data may be packetized such that sections of audio data are sent in discrete units called packets. Each packet may include a header or similar metadata section that includes information about the audio data, such as its length, sample rate, channel, or other such information, and may further include a data or payload section that includes the actual audio data. Any type of packet is, however, within the scope of the present disclosure. In other embodiments, the audio is non-packetized. Any system and method for transmission of audio is also within the scope of the present disclosure. In other embodiments, the first device 110a receives other types of data from the third device 112, such as sensor data, control data, firmware-update data, or other data.

When the first device 110a has not determined initiation of an audio-input mode, the first device 110a sends (504) some or all of the audio data to the second device 110b. If, for example, the audio data includes left and right stereo channels, the first device 110a may send only one of the left or right stereo channels to the second device 110b. Prior to, during, or after sending the audio data to the second device 110b, the first device 110a adds delay (506) to account for the time spend sending the audio data to the second device 110b and thereafter outputs (508) first audio corresponding to the audio data; the second device outputs (510) second audio corresponding to the audio data. In some embodiments, the first device 110a and/or second device 110b store the audio data in local storage, such as memory 316a/b, prior to outputting corresponding audio. In some embodiments, the memory 316a/b may be configured as an audio output/playback buffer. One of skill in the art will understand that, while the sending of the audio data from the third device 112 and first device 110a may occur at irregular or uncertain intervals, while the audio playback buffers remain non-empty, the first device 110a and second device 110b output audio synchronously, meaning that a given audio sample is output at or near the same time by both the first device 110a and the second device 110b. During the outputting of the audio, the first device 110a and third device 112 may periodically send and receive brief maintenance or "sniff" data to maintain the second wireless connection 114b; the sniff data may be sent, for example, every 200 milliseconds.

FIG. 6 illustrates a process flow 600 in which the first device 110a determines (602) initiation of an audio-input mode. In some embodiments, the first device 110a makes this determination by monitoring its microphone 304a. The determination may include the audio processing component 220 determining audio data from the audio 11 and/or the audio processing component 220 detecting a volume level greater than a threshold in the audio 11. Alternatively or in addition, the VAD component 222 may detect speech in the audio 11. In addition, in some embodiments, the wakeword detection component 222 detects a wakeword in the audio 11. The first device 110a may monitor its microphone 304a continually, periodically, at certain times of day, or at other intervals.

Once the first device 110a determines initiation of the audio-input mode, it transmits (604) first data indication the initiation to the second device 110b. As explained in greater detail with reference to FIG. 9, the second device 110b enters a mode, referred to herein as a mute mode, in which it receives data corresponding to duration of audio playback and outputs blank samples in accordance with the duration. The first device 110a receives (606) first audio data from the third device 112 which may include, as described herein, one or more packets of audio data. The first device 110 determines (608) a duration of playback of first audio corresponding to the first audio data by, as also described herein, determining a number of samples in each received audio packet. The first device 110a sends (610) second data indicating the duration of playback to the second device 110b.

FIGS. 7 and 8 are process flows 700 and 800 corresponding to embodiments in which the first device 110a determines termination of the audio-input mode. In some embodiments, with reference first to FIG. 7, the first device 110a sends (702) captured audio to the third device 112. As explained herein, the first device 110a may detect a wakeword in the audio 11 and send corresponding audio data; the audio data may include a representation of the wakeword and/or additional speech representing a command or request. In other embodiments, the first device 110a sends audio data captured as part of a communication, such as a phone call, and no wakeword is detected or required.

In some embodiments, after the first device 110a sends the captured audio data, no response is required or expected for the user 5. For example, the audio data may represent a command to raise or lower volume of a device; the first device 110a, third device 112, and/or remote device(s) 120 may simply execute the command and not provide any other corresponding audio output response. In these embodiments, the first device receives (704) notification of termination of the audio-input mode from, for example, the third device; the first device may then determine (706) termination of the audio-input mode and sends (708) indication of the termination to the second device 110b. The first device 110a and/or second device 110b may raise their output volume levels to prior levels if they had lowered them in response to entering the audio-input mode. The first device 110a and third device 112 may resume sending periodic sniff data. In some embodiments, the captured audio data includes a command to initiate to a two-way communication, such as a telephone call. In these embodiments, the third device 112 may send bandwidth-reduced audio data to the first device 110a over the second wireless connection 114b, such as monaural audio data in lieu of stereo audio data, to thereby create bandwidth available for the first device 110a to send captured audio to the third device 112. In response to receiving the bandwidth-reduced audio data and/or in response to a command, the first device 110a may send an indication to the second device 110b to terminate the audio-input mode.

In other embodiments, with reference to FIG. 8, an audio response is provided to the user 5. The first device 110a sends (802) captured audio to the third device 112 and receives (804) a response therefrom. The first device 110a first outputs (806) audio corresponding to the response before determining (808) termination of the audio-input mode—in some embodiments, based at least in part on receiving notification of the termination from the third device—and sending (810) indication of the termination to the second device 110b.

Figure 9:
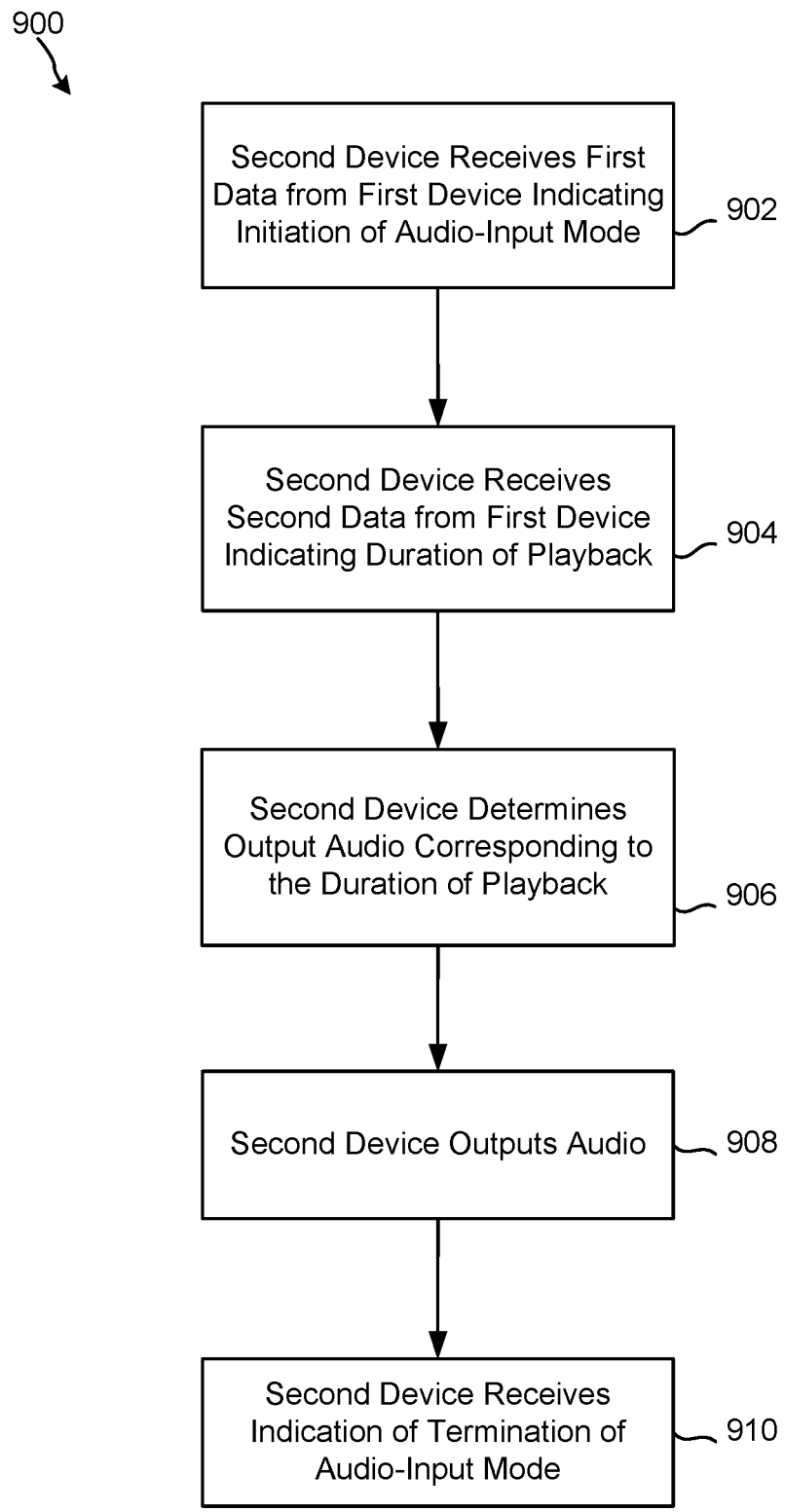

FIG. 9 is a process flow 900 from the point of view of the second device 110b. The second device 110b receives (902) first data indicating initiation of the audio-input mode from the first device 110a. As explained herein, the second device 110b may enter a mute mode in response to the receipt of the indication. Entering the mute mode may include outputting one or more packets of audio data already present in the memory 316b of the second device 110b. In the mute mode, the audio processing component 220 of the second device 110b receives (904) second data from the first device 110a and determines (906) output audio corresponding to duration of playback of the audio data. The second data may include, for example, a packet comprising a header and a payload; the payload may include an indication of a number of samples of audio. The audio processing component 220 may then insert a corresponding number of audio samples into an audio playback buffer in the memory 316b. The inserted audio samples may be blank samples (i.e., samples having zero volume), white-, brown-, or other types of noise-based samples, pre-recorded or predetermined samples, or any other types of samples.

In some embodiments, the second device 110b uses active noise cancellation (ANC) techniques to remove or reduce some or all ambient audio noise from reaching the ear of a user. For example, if the ambient noise includes a sound wave of a certain frequency and amplitude, the second device 110b may detect this noise using its microphone and output a sound wave having the same frequency but opposite amplitude, thus cancelling out the ambient noise. In these embodiments, the second device 110b may use ANC during the audio-input mode; the audio output by the second device 110b may thus include ANC audio in addition to the inserted audio samples.

The second device 110b outputs (908) audio corresponding to the determined output audio. If the second device 110b receives additional data from the first device 110a, it similarly determines further durations of the data and outputs corresponding audio. In some embodiments, the second device 110b receives the second data but does not output corresponding output; it instead outputs nothing and merely waits an amount of time as specified in the duration of playback in the second data. For example, the second device 110b may include a timer that is set to the amount of time; when the timer expires, the second device 110b begins outputting audio received from the first device 110a.

Figure 10:
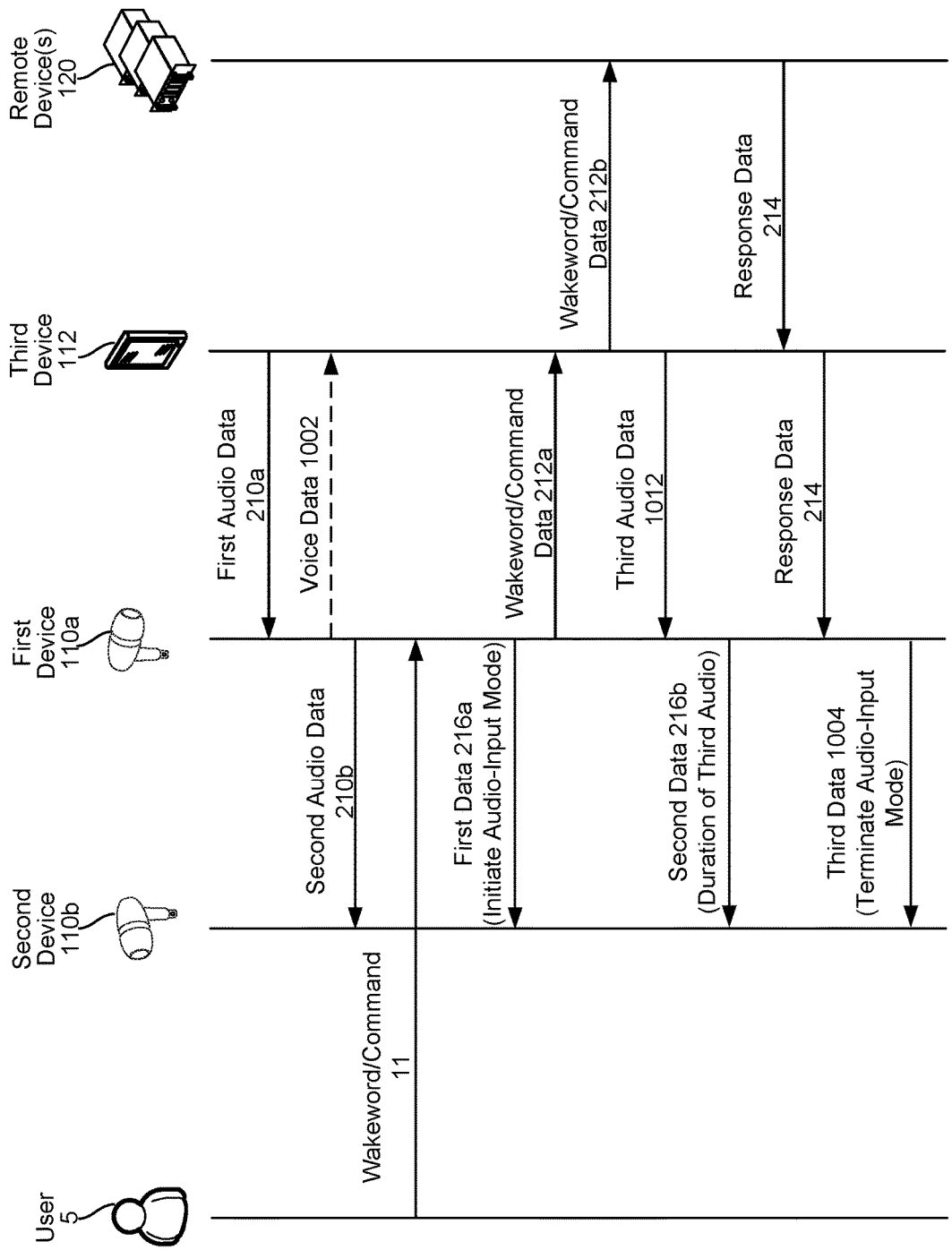

FIG. 10 illustrates movement of data between the user 5, the first device 110a, the second device 110b, the third device 112, and the remote device(s) 120. The third device 112 sends first audio data 210a to the first device over the first wireless connection 114a, and the first device 110a sends second audio data 210b to the second device 110b over the second wireless connection 114b. If there is two-way communication between the first device 110a and the third device 112, such as in the case of telephone calls, the first device 110a may send voice data 1002 to the third device 112. As explained further herein, the first device 110a outputs the first audio data 210a and the second device 110b outputs the second audio data 210b.

While the first and second audio data 210b, 210b is being output, the user 5 utters a wakeword and/or command 11, which is detected by the first device 110a in accordance with the present disclosure. The first device 110a sends first data 216a to the second device 110b indicating initiation of the audio-input mode and sends wakeword/command data 212a corresponding to the wakeword/command 11 to the third device, which forwards it to the remote device 120. The remote device 120 analyzes the wakeword/command data 212b in accordance with the present disclosure and sends response data 214 to the third device 112, which in turn sends it to the first device 110a. The first device 110a may receive notification of termination of the audio-input mode from the third device 112, determines termination, and sends corresponding third data 1004 to the second device 110b.

Figure 11:
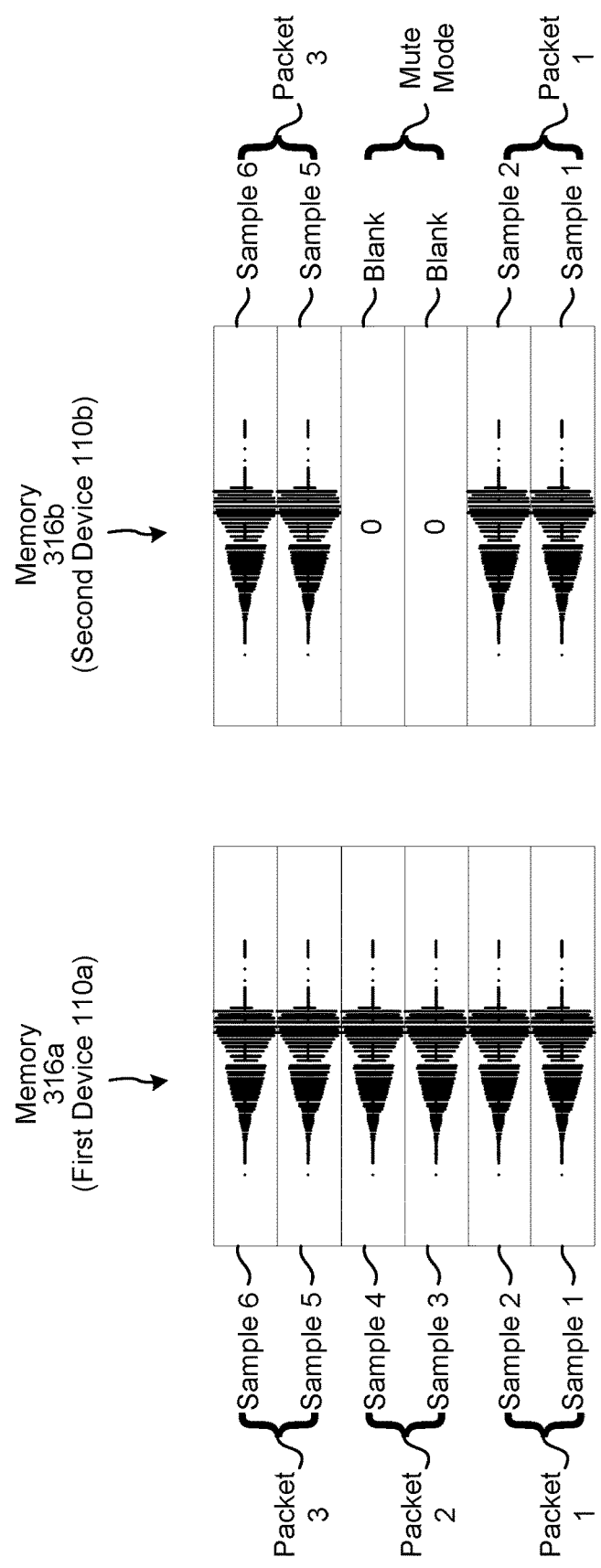
FIG. 11 illustrates an example of operation of an audio output, capture, and sending system according to embodiments of the present disclosure.

With reference to the above figures and to FIG. 11, an example of operation of the first device 110a and the second device 110b may further illustrate embodiments of the present disclosure. In this example, the first device 110a and second device 110b are both outputting a first packet 1 that includes two samples 1 and 2. During playback of the first packet 1, the first device 110a determines initiation of the audio-capture mode and sends corresponding first data indicating the initiation to the second device 110b. Instead of sending the next packet 2 to the second device 110b, the first device 110a instead sends second data indicating a number of samples of audio data in the second packet 2—in this example, two samples. The second device 110b then inserts two corresponding blank samples into its audio playback buffer; as described above, the blank samples may be added in addition to ANC audio. The second device 110b thus stays in sync with the first device 110a as it plays back the two actual samples 3 and 4 of the second audio packet 2. The first device 110a determines termination of the audio input mode and sends the third packet 3, containing samples 5 and 6, to the second device 110b for playback thereon.

Figure 12:
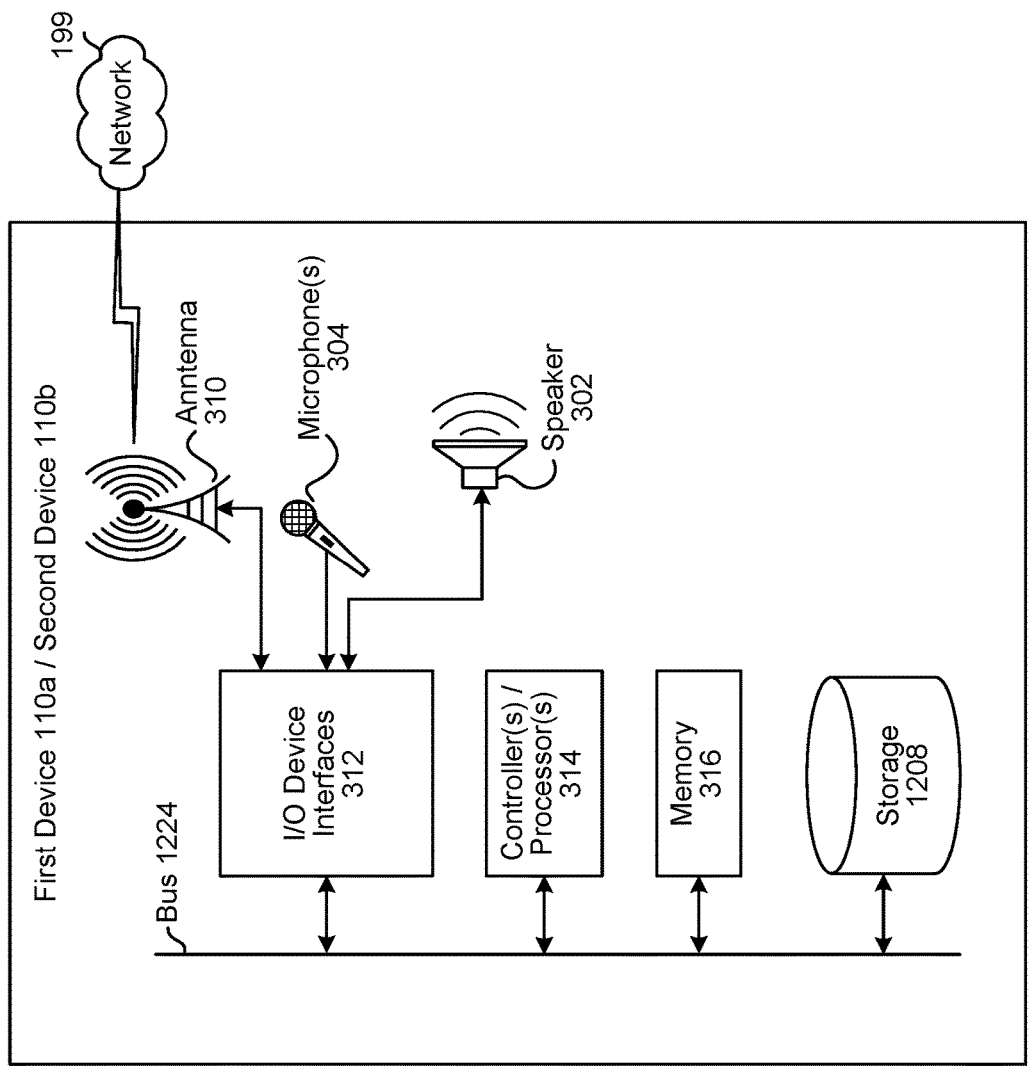
FIGS. 12-14 are block diagrams conceptually illustrating example components of devices according to embodiments of the present disclosure.
Figure 13:
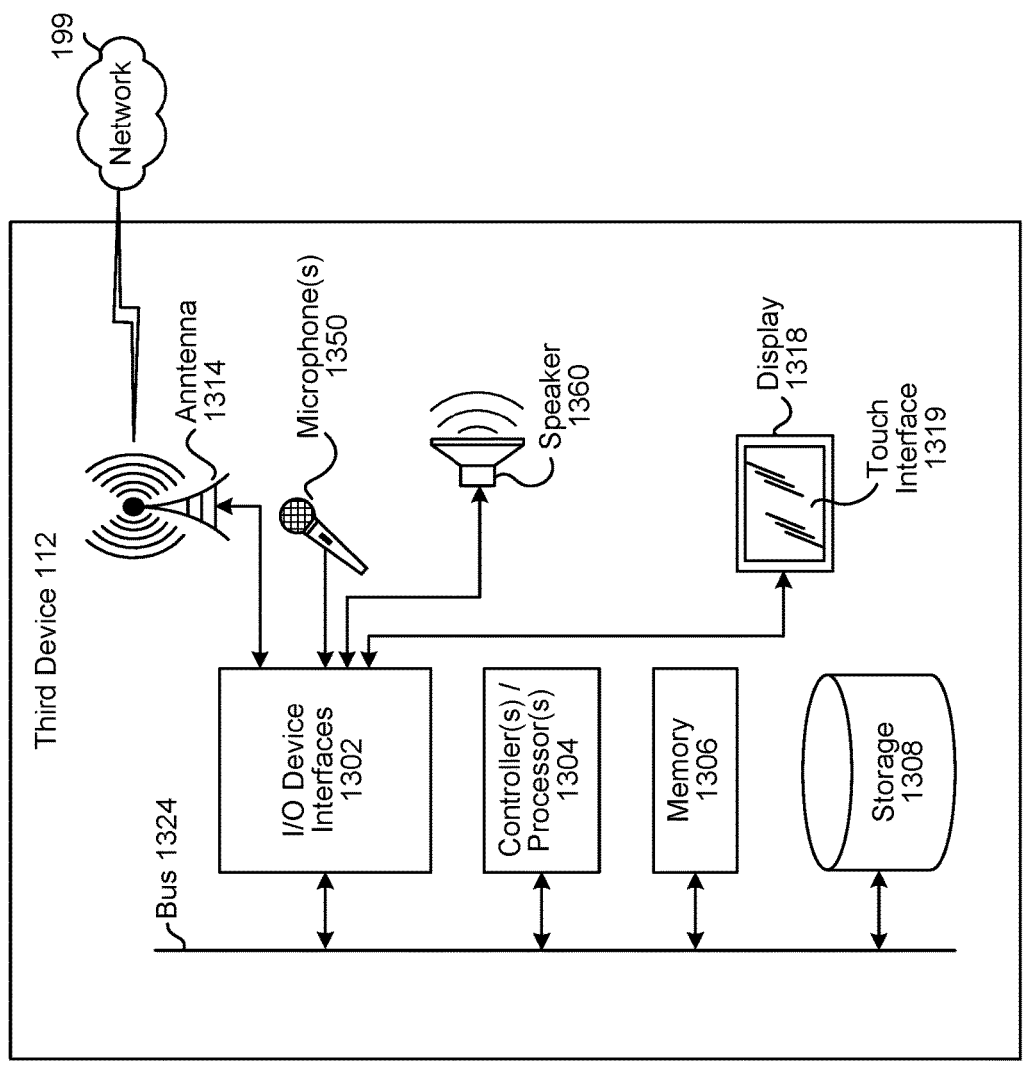
Figure 14:
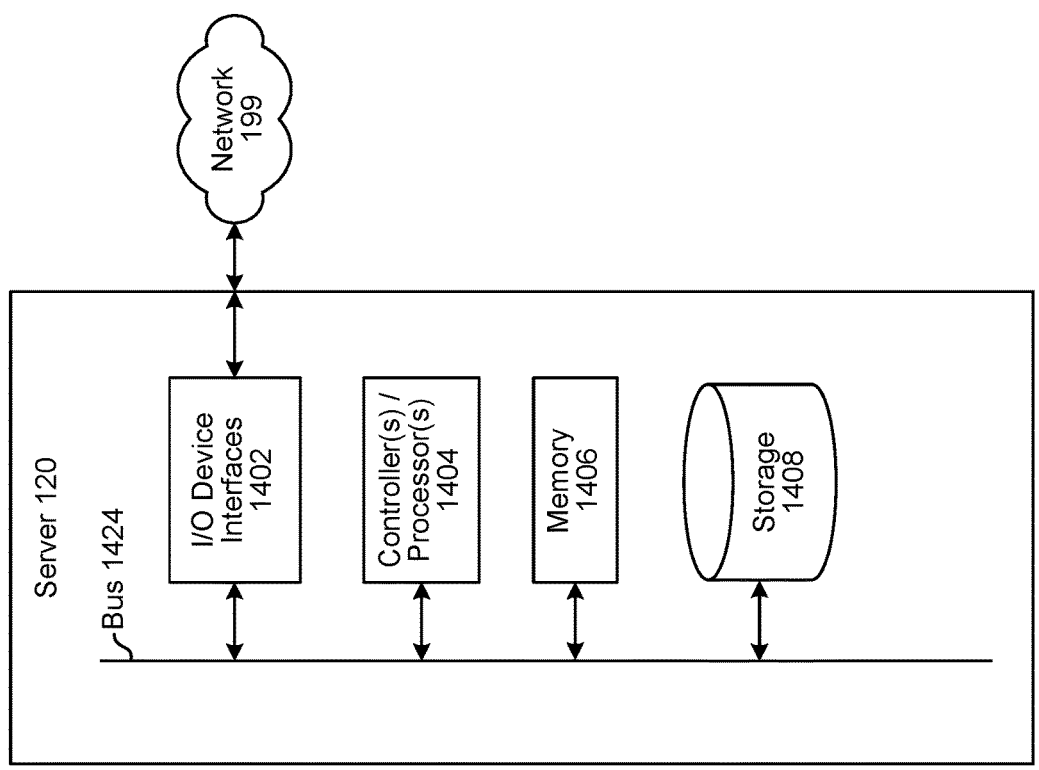

FIG. 12 is a block diagram conceptually illustrating a first device 110a or second device 110b that may be used with the described system. As mentioned above, however, the second device 110b may include only a subset of the components of the first device 110a. FIG. 13 is a block diagram conceptually illustrating a third device 112 that may be used with the described system. FIG. 14 is a block diagram conceptually illustrating example components of a remote device, such as a remote server 120, that may assist with ASR, NLU processing, command processing, or the like. Multiple such devices 120 may be included in the system, such as one server(s) for performing ASR, one server(s) 120 for performing NLU, etc. In operation, each of these devices (or groups of devices) may include computer-readable and computer-executable instructions that reside on the respective device (110a/110b/112/120), as will be discussed further below.

Each of these devices (110a/110b/112/120) may include one or more controllers/processors (314/1304/1404), which may each include a central processing unit (CPU) for processing data and computer-readable instructions and a memory (316/1306/1406) for storing data and instructions of the respective device. The memories (316/1306/1406) may individually include volatile random-access memory (RAM), non-volatile read only memory (ROM), non-volatile magnetoresistive (MRAM) memory, and/or other types of memory. Each device may also include a data-storage component (1208/1308/1408), for storing data and controller/processor-executable instructions. Each data-storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (312/1302/1402).

Computer instructions for operating each device (110a/110b/112/120) and its various components may be executed by the respective device's controller(s)/processor(s) (314/1304/1404), using the memory (316/1306/1406) as temporary "working" storage at runtime. A device's computer instructions may be stored in a non-transitory manner in non-volatile memory (316/1306/1406), storage (1208/1308/1408), or an external device(s). Alternatively, some or all of the executable instructions may be embedded in hardware or firmware on the respective device in addition to or instead of software.

Each device (110a/110b/112/120) includes input/output device interfaces (312/1302/1402). A variety of components may be connected through the input/output device interfaces, as will be discussed further below. Additionally, each device (110a/110b/112/120) may include an address/data bus (1224/1324/1424) for conveying data among components of the respective device. Each component within a device (110a/110b/112/120) may also be directly connected to other components in addition to (or instead of) being connected to other components across the bus (1224/1324/1424).

For example, via the antenna 310/1314, the input/output device interfaces 312/1202 may connect to one or more networks 199 via a wireless local area network (WLAN) (such as WI-FI) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the speech processing system may be distributed across a networked environment.

Referring to the device 110a/110b/112 of FIGS. 12 and 13, the device 110a/110b/112 may also include input/output device interfaces 31/1302 that connect to a variety of components, such as an audio output component like a speaker 302/1360 or other component capable of outputting audio. The device 110a/110b/112 may also include an audio capture component which may be, for example, a microphone 304/1350 or array of microphones. The microphone 1250/1350 may be configured to capture audio. The microphones 304a and 304b may be used to determine an approximate distance to a sound's point of origin; acoustic localization, based on time and/or amplitude differences between sounds captured by different microphones of the array, i.e., beam forming, may be performed. The device 110a/110b/112 (using microphone 304/1350, wakeword detection module 224, ASR module 250, etc.) may be configured to determine audio data corresponding to detected audio. The device 110a/110b/112 (using input/output device interfaces 312/1202, antenna 310/1214, etc.) may also be configured to transmit the audio data to server 120 for further processing or to process the data using internal components such as a wakeword detection module 224. As a way of indicating to a user that a communication connection to another device has been created, the device 110a/110b/112 may be configured with a visual indicator, such as an LED or similar component (not illustrated), that may change color, flash, or otherwise provide visual indications by the device 110a/110b/112. The device 112 may include a display 1218, which may comprise a touch interface 1219.

The device 110a/110b may include a wakeword detection component 224. The wakeword detection component 224 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110a/110b may be configured collectively to identify a set of the directional audio signals in which the wake expression is detected or in which the wake expression is likely to have occurred.

The wakeword detection component 224 receives captured audio and processes the audio to determine whether the audio corresponds to particular keywords recognizable by the device 110a/110b. The storage 1208 may store data relating to keywords and functions to enable the wakeword detection module 224 to perform the algorithms and methods described above. The locally stored speech models may be pre-configured based on known information, prior to the device 110a/110b being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110a/110b prior to the user device being delivered to the user or configured to access the network by the user. The wakeword detection component 224 may access the storage 1208 and compare the captured audio to the stored models and audio sequences using audio comparison, pattern recognition, keyword spotting, audio signature, and/or other audio processing techniques.

As noted above, multiple devices may be employed in a single speech processing system. In such a multi-device system, each of the devices may include different components for performing different aspects of the speech processing. The multiple devices may include overlapping components. The components of the first and second devices 110a/110b, third device 112, and server 120, as illustrated in FIGS. 12, 13, and 14, are exemplary, and may be located a stand-alone device or may be included, in whole or in part, as a component of a larger device or system. The concepts disclosed herein may be applied within a number of different devices and computer systems, including, for example, general-purpose computing systems, speech processing systems, and distributed computing environments.

Figure 15:
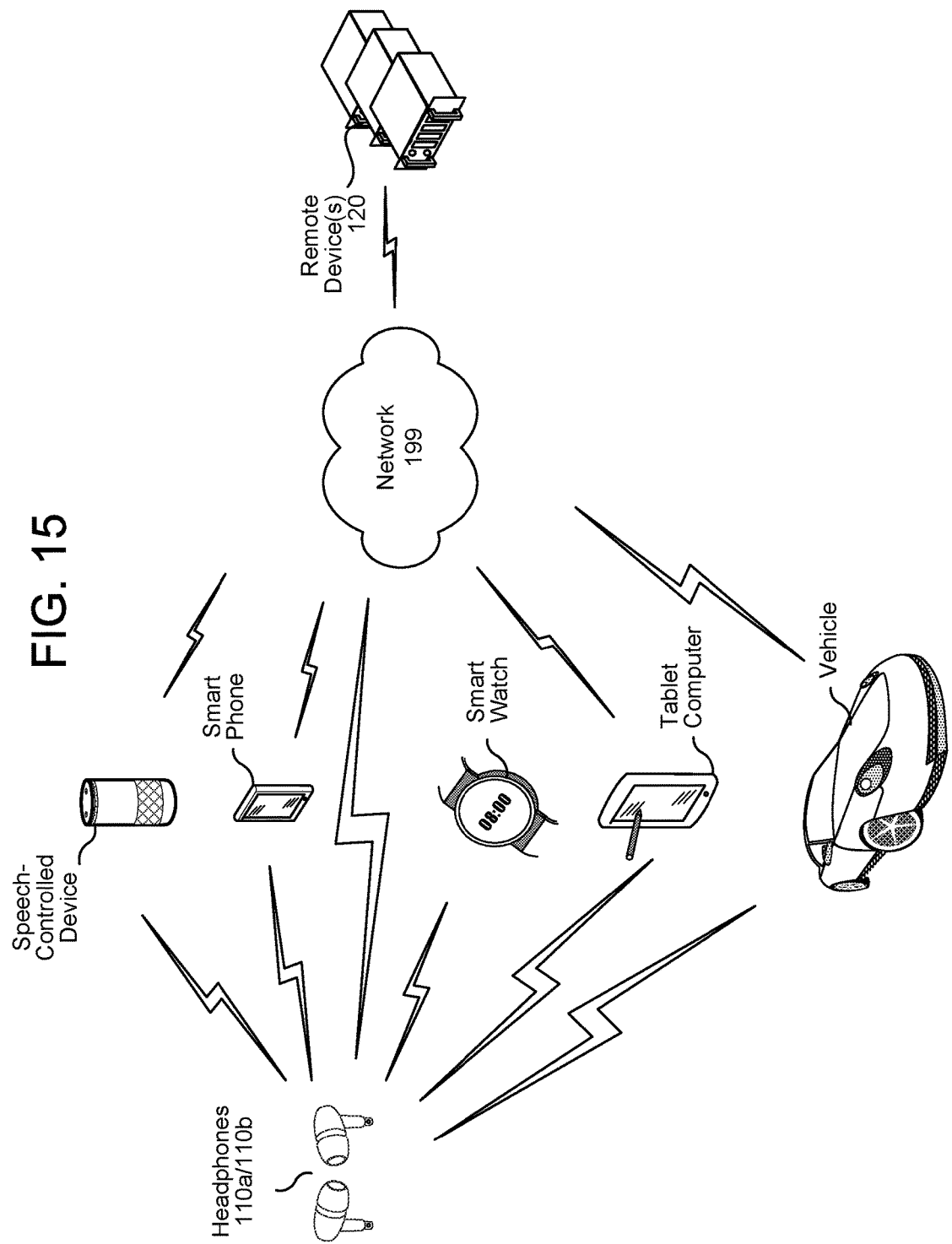
FIG. 15 illustrates an example of a computer network for use with the audio output, capture, and sending system.

As illustrated in FIG. 15 multiple devices may contain components of the system 100 and the devices may be connected over a network 199. The network 199 may include one or more local-area or private networks and/or a wide-area network, such as the internet. Local devices may be connected to the network 199 through either wired or wireless connections. For example, a speech-controlled device, a tablet computer, a smart phone, a smart watch, and/or a vehicle may be connected to the network 199. One or more remote device(s) 120 may be connected to the network 199 and may communicate with the other devices therethrough. Headphones 110a/110b may similarly be connected to the remote device(s) 120 either directly or via a network connection to one or more of the local devices. The headphones 110a/110b may capture audio using one or more microphones or other such audio-capture devices; the headphones 110a/110b may perform audio processing, VAD, and/or wakeword detection, and the remove device(s) 120 may perform ASR, NLU, or other functions.

The above aspects of the present disclosure are meant to be illustrative and were chosen to explain the principles and application of the disclosure; they are not intended to be exhaustive or to limit the disclosure. Many modifications and variations of the disclosed aspects may be apparent to those of skill in the art. Persons having ordinary skill in the field of computers, wearable devices, and speech processing will recognize that components and process steps described herein may be interchangeable with other components or steps, or combinations thereof, and still achieve the benefits and advantages of the present disclosure. Moreover, it will be apparent to one skilled in the art that the disclosure may be practiced without some or all of the specific details and steps disclosed herein. As the term is used herein, "component" may be interchanged with similar terms, such as "module" or "engine."

Aspects of the disclosed system may be implemented as a computer method or as an article of manufacture, such as a memory device or non-transitory computer readable storage medium. The computer-readable storage medium may be readable by a computer and may comprise instructions for causing a computer or other device to perform processes described in the present disclosure. The computer-readable storage medium may be implemented by a volatile computer memory, non-volatile computer memory, hard drive, solid-state memory, flash drive, removable disk, and/or other media. In addition, components of system may be implemented in firmware and/or hardware, such as an acoustic front end (AFE), which comprises, among other things, analog and/or digital filters (e.g., filters configured as firmware to a digital signal processor (DSP)).

Conditional language used herein, such as, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    detecting first audio using a primary wireless earbud, wherein the primary wireless earbud:
        comprises a first set of microphones,
        is wirelessly connected to a secondary wireless earbud over a first wireless communication connection, and
        is wirelessly connected to a mobile device over a second wireless communication connection;
    determining, by the primary wireless earbud, first audio data corresponding to the first audio;
    determining, by the primary wireless earbud, presence of a wakeword represented in the first audio data;
    sending, from the primary wireless earbud to the secondary wireless earbud, data corresponding to detection of the wakeword;
    receiving, at the primary wireless earbud from the mobile device, a first packet of second audio data corresponding to second audio, the second audio including music;
    determining, by the primary wireless earbud, a number of audio samples in the first packet of second audio data, the number of audio samples corresponding to a length of the first packet of second audio data;
    sending, by the primary wireless earbud to the secondary wireless earbud, a second packet of audio data comprising the number of audio samples but not the second audio data;
    generating, at the secondary wireless earbud, third audio data corresponding to the number of audio samples;
    outputting, by the primary wireless earbud, the second audio; and
    outputting, by the secondary wireless earbud, third audio corresponding to the third audio data.

2. The method of claim 1, further comprising:
    sending, from the primary wireless earbud to the secondary wireless earbud using the first wireless communication connection, second data corresponding to termination of an audio-input mode;

receiving, by the primary wireless earbud from the mobile device, fourth audio data corresponding to second music;
sending, from the primary wireless earbud to the secondary wireless earbud using the first wireless communication connection, the fourth audio data; and
outputting, at the secondary wireless earbud, fourth audio corresponding to the fourth audio data in sync with the primary wireless earbud outputting the fourth audio.

3. The computer-implemented method of claim 1, further comprising:
receiving, from the mobile device and prior to determining the wakeword, fourth audio data;
outputting, by the primary wireless earbud, fourth audio corresponding to the fourth audio data;
receiving, by the secondary wireless earbud using the first wireless communication connection, the fourth audio data; and
outputting, by the secondary wireless earbud, fourth audio corresponding to the fourth audio data.

4. The method of claim 1, further comprising:
receiving, from a server, fourth audio data including a response to a command in the first audio data;
outputting, by the primary wireless earbud, fourth audio corresponding to the fourth audio data; and
after outputting the fourth audio, sending, to the secondary wireless earbud, second data corresponding to termination of an audio-input mode.

5. A computer-implemented method comprising:
receiving, by a first device from a second device, first audio data via a first wireless connection;
sending, by the first device to a third device via a second wireless connection, a first portion of the first audio data;
determining, by the first device, initiation of an audio-input mode;
sending, from the first device to the third device using the second wireless communication connection, first data indicating initiation of the audio-input mode;
in response to determining initiation of the audio-input mode, determining, by the first device, a duration of playback of first audio corresponding to a second portion of the first audio data; and
sending, to the third device, second data indicating the duration of playback instead of the second portion of the first audio data.

6. The computer-implemented method of claim 5, further comprising:
receiving, by the third device, the second data;
generating, by the third device and based at least in part on the second data, output audio data corresponding to the duration of playback; and
outputting, by the third device, output audio corresponding to the output audio data.

7. The computer-implemented method of claim 6, wherein generating the output audio data comprises generating a number of blank audio packets corresponding to the second data.

8. The computer-implemented method of claim 5, further comprising:
determining that the audio-input mode corresponds to a call;
sending, from the first device to the third device, second data indicating termination of the audio-input mode;
receiving, from the second device at the first device, monaural audio data; and
outputting, by the first device, monaural audio corresponding to the monaural audio data.

9. The computer-implemented method of claim 5, wherein determining the duration comprises determining a number of samples in the second portion of the first audio data, and the method further comprises:
outputting, by the first device during a first time period, a first sample of the first audio data; and
outputting, by the third device during the first time period, a second sample corresponding to the number of samples.

10. The computer-implemented method of claim 5, further comprising:
outputting, by the first device, first output audio corresponding to the first portion of the first audio data; and
outputting, by the third device, second output audio corresponding to the first portion of the first audio data.

11. The computer-implemented method of claim 5, further comprising:
detecting, by the first device, third audio corresponding to an utterance;
storing, by the first device, the third audio data; and
after sending the first data, sending the third audio data from the first device to the second device using the first wireless communication connection.

12. The computer-implemented method of claim 5, further comprising:
sending, from the first device to the third device, second data indicating termination of the audio-input mode;
receiving, by the first device from the second device, third audio data; and
sending, from the first device to the third device, the third audio data.

13. A system comprising:
at least one processor; and
at least one memory including instructions that, when executed by the at least one processor, cause the system to:
receive, by a first device from a second device, first audio data via a first wireless connection;
send, by the first device to a third device via a second wireless connection, a first portion of the first audio data;
determine, by the first device, initiation of an audio-input mode;
send, from the first device to the third device using the second wireless communication connection, first data indicating initiation of the audio-input mode;
in response to determining initiation of the audio-input mode, determine, by the first device, a duration of playback of first audio corresponding to a second portion of the first audio data; and
send, to the third device, second data indicating the duration of playback instead of the second portion of the first audio data.

14. The system of claim 13, wherein the memory includes further instructions that, when executed by the at least one processor, further cause the system to:
receive, by the third device, the second data;
generate, by the third device and based at least in part on the first data, output audio data corresponding to the duration of playback; and
output, by the third device, output audio corresponding to the output audio data.

15. The system of claim 14, wherein the instructions that, when executed, cause the system to generate the output audio data comprises comprise instructions that, when executed, cause the system to generate a number of blank audio packets corresponding to the second data.

16. The system of claim 13, wherein the memory includes further instructions that, when executed by the at least one processor, further cause the system to:
   determine that the audio-input mode corresponds to a telephone call;
   send, from the first device to the third device, second data indicating termination of the audio-input mode;
   receive, from the second device at the first device, monaural audio data; and
   output, by the first device, monaural audio corresponding to the monaural audio data.

17. The system of claim 13, wherein the instructions that, when executed, cause the system to determine the duration comprise instructions that, when executed, cause the system to determine a number of samples in the first portion of the first audio data and wherein the memory includes further instructions that, when executed by the at least one processor, further cause the system to:
   output, by the first device during a first time period, a first sample of the first audio data; and
   output, by the third device during the first time period, a second sample corresponding to the number of samples.

18. The system of claim 13, wherein the memory includes further instructions that, when executed by the at least one processor, further cause the system to:
   output, by the first device, first output audio corresponding to the second first portion of the first audio data; and
   output, by the third device, second output audio corresponding to the first portion of the first audio data.

19. The system of claim 13, wherein the memory includes further instructions that, when executed by the at least one processor, further cause the system to:
   detect, by the first device, third audio corresponding to an utterance;
   store, by the first device, the third audio data; and
   after sending the first data, send the third audio data from the first device to the second device using the second first wireless communication connection.

20. The system of claim 13, wherein the memory includes further instructions that, when executed by the at least one processor, further cause the system to:
   send, from the first device to the third device using the second wireless communication connection, second data indicating termination of the audio-input mode;
   receive, from the second device to the first device using the second first wireless communication connection, third audio data; and
   send, from the first device to the third device using the second wireless communication connection, the third audio data.

* * * * *